Patented Feb. 13, 1951

2,541,285

UNITED STATES PATENT OFFICE 2,541,285

AQUEOUS SOLUTIONS OF VITAMIN A ESTERS

Albert L. Rawlins, Grosse Pointe Woods, Mich., assignor to Parke, Davis & Company, Detroit, Mich., a corporation of Michigan No Drawing. Application March 24, 1945, Serial No. 584,741

5 Claims. (Cl. 167—81)

This invention relates to preparations containing organic compounds which are required for normal growth and maintenance of life in mammals and in particular, relates to vitamin preparations.

One of the objects of this invention is to provide clear, stable, non-toxic aqueous solutions which contain oil soluble vitamins. Another object of the invention is to obtain vitamin powders from these aqueous solutions which are stable, non-toxic, non-hygroscopic and readily and completely soluble in water.

It is also an object of the invention to produce these stable, non-toxic aqueous solutions and water soluble powders without alteration of the vitamins or impairment of their physiological activity.

A further object of this invention is to provide vitamin solutions and powders which are inodorous and not more offensive to the sense of taste than the vitamins contained therein.

In the past numerous unsuccessful attempts have been made to obtain aqueous solutions containing both the water and oil soluble vitamins which are stable. These attempts have been unsuccessful due to the difficulty encountered in solubilizing the oil soluble vitamins such as vitamins A and D and particularly vitamin A.

It is known that vitamin A in the free alcohol form is relatively unstable chemically and is difficult to get into aqueous solution. Hence, attempts to make aqueous solutions containing vitamin A activity have been made using esters of vitamin A alcohol because of their greater chemical stability. Mixtures of higher saturated and unsaturated fatty acid esters of vitamin A alcohol are economically obtained at the present time by high vacuum distillation methods carried out on natural and unsaponified oils containing said activity, such as fish liver oils. However, no method was known for solubilizing practical amounts of these higher esters of vitamin A alcohol.

I have found that by employing an ester of a high molecular weight aliphatic carboxylic acid with a straight chain polyethylene glycol of high molecular weight, it is possible to produce clear, stable aqueous solutions of vitamin A esters. This holds for vitamin A ester distillates, as well as for other oils containing a vitamin A alcohol ester of a straight chain higher aliphatic carboxylic acid. These solutions are non-toxic, inodorous and are not more offensive to the taste than the vitamins contained therein. My use of the esters mentioned above is of particular value when making solutions of the mixture of vitamin A esters as they are customarily obtained from natural oils by the known methods for obtaining vitamin A concentrates, since solutions of very high potency, i. e. up to 25,000 international units per milliliter (ml.) and higher, can be obtained.

I have also found that my solutions may be converted to vitamin powders and that this process may be carried out with no destruction of the vitamin activity present in the original solution. These vitamin powders are stable, non-hygroscopic, non-toxic, inodorous, are no more offensive to the taste than the natural vitamins and possess the added advantage that they are readily and completely soluble in water to reproduce the original vitamin solution. Moreover, I have found that all other known vitamins may be dissolved in or by my aqueous vitamin A ester solutions without damage to the physiological activity of any vitamins present or loss of any of the desirable physical properties of the solutions. This finding was indeed surprising in view of the fact that the D vitamins, like the vitamin A esters, are very difficult to solubilize because of their complete insolubility in water. These aqueous solutions which contain, in addition to vitamin A esters, other vitamins such as riboflavin, thiamin chloride, irradiated ergosterol, nicotinamide, pyridoxin, ascorbic acid, d-pantothenic acid, α-tocopherol, the natural K vitamins such as 2-methyl-3-phytyl - 1,4 - naphthoquinone, or synthetic K vitamins, e. g. 2-methyl-4-amino-1-naphthol, 2-methyl - 1,4 - naphthoquinone, the salts of the disulfuric and diphosphoric acid esters of 2-methyl - 1,4 - naphthohydroquinone, and like compounds, may also be converted to stable, water soluble vitamin powders possessing the same physical properties as the vitamin powders described above containing only vitamin A esters.

I have found that my new vitamin solutions should be kept at pH values between about pH 4 and pH 7.5 to prevent alteration and destruction of the dissolved vitamins. I prefer the solutions which have a pH of about pH 4.5 because they are more satisfactory when vitamins of the B-complex, such as vitamins B₁ and B₂ (thiamin chloride and riboflavin), are present.

My new vitamin preparations, in the form of aqueous solutions, are entirely free from solid or suspended matter and they are so non-toxic and stable, physically and chemically, that they may even be administered parenterally as well as by the conventional oral route.

The high molecular weight acid portions of the esters which I use as solubilizers are mono-basic aliphatic carboxylic acids containing from 16 to 21 carbon atoms inclusive. By aliphatic carboxylic acids it should be known and understood that I include within this term both the saturated and unsaturated aliphatic carboxylic acids. The polyethylene glycol portions of the esters which I use are straight chain polyethylene glycols having average molecular weights between 700 and 1500. The solubilizing high molecular weight esters are readily obtained by heating the carboxylic acid with an excess of the glycol in the presence of sulfuric acid. One method of preparing esters of this type is disclosed in the patent to Schoeller et al. No. 1,970,578, August 21, 1934.

I prefer to use esters of which the acid moiety is a straight chain aliphatic carboxylic acid such as palmitic, margaric, stearic, arachidic, oleic and linoleic acids, and of which the glycol portion is a straight chain polyethylene glycol having an average molecular weight between about 800 and 1200. Such preferred glycol esters make it possible to put considerably larger amounts of vitamin A esters in solution than by using the other glycol esters. These preferred esters are also commercially available in large quantities.

The invention may be illustrated by the following detailed examples.

Example 1

1 g. of ethanolamine and 9.17 g. of nicotinamide are dissolved in 150 ml. of distilled water. 0.73 g. of riboflavin is added with stirring to the solution, heat is applied until solution is effected and the solution cooled immediately. Ascorbic acid, 60 g., is added and dissolved by stirring and with continued efficient stirring 40 ml. of 5 N sodium hydroxide solution (8 g. of sodium hydroxide) is added dropwise. A solution of 2.92 g. of thiamin chloride hydrochloride, 1.83 g. of pyridoxin hydrochloride and 5.5 g. of sodium d-pantothenate in 70 ml. of distilled water is added with stirring and finally 100 g. of sucrose dissolved in 200 ml. of water is added with continued stirring.

100 g. of the monoester of stearic acid and a polyethylene glycol having an average molecular weight of approximately 1000 is warmed to 50° C. and 25 g. of vitamin A distillate (450,000 international units/g.) and 1.25 ml. of an alcohol solution of irradiated ergosterol (1,000,000 international units/ml.) are added while maintaining the temperature at 40-50° C. The mixture is stirred until solution is complete and then the solution is added with vigorous stirring to the above aqueous solution. After the addition is completed and a clear solution obtained the solution is made up to a volume of 1 l. with distilled water. While it is preferable to use glass or glass lined equipment in the practice of the present invention it should be obvious to those skilled in the art that equipment fabricated from other materials which do not destroy vitamin activity may also be used in the preparation of these vitamin solutions with equally satisfactory results.

The vitamin solution prepared as above is a clear, stable, non-toxic, non-bitter, amber-colored solution which is particularly well suited for oral administration.

Example 2

The clear vitamin solution prepared in Example 1 is placed in suitably sized bottles and frozen while being rotated thus producing a frozen shell of material inside the bottle. The material is desiccated by subliming the ice from the frozen material under a pressure of approximately 100 microns to produce a yellow, stable, relatively non-hygroscopic powder. This product is readily and completely soluble in water in addition to being non-bitter to the taste and non-toxic. This powder may be conveniently administered orally, either as a powder, a tablet or an aqueous solution.

Example 3

27.50 g. of nicotinamide and 1.50 g. of ethanolamine are dissolved in 350 ml. of distilled water. 1.10 g. of riboflavin is added and the mixture warmed until solution is effected. After cooling, 18 g. of ascorbic acid is added and the mixture stirred until solution is complete. 3.5 ml. of 5 N sodium hydroxide solution is added dropwise with stirring and finally a solution of 7.5 g. of sodium d-pantothenate and 0.55 g. of pyridoxin hydrochloride in 75 ml. of distilled water is added.

A second solution consisting of 7.5 g. of vitamin A distillate (450,000 international units/g.) and 0.38 ml. of alcoholic irradiated ergosterol solution (1,000,000 international units/ml.) in 100 g. of the mono-stearic acid ester of a polyethylene glycol having an average molecular weight of approximately 1000 is prepared by melting the ester and adding the vitamins thereto with stirring. This solution is combined with the first solution, prepared as above, with efficient stirring and the solution made up to a volume of 1 l. with distilled water.

The clear, amber-colored solution is very non-toxic, stable and is suitable for parenteral use. When this solution is administered in this manner it is conveniently dispensed in 2.2 ml. portions sealed in ampoules.

Example 4

55.6 g. of vitamin A distillate (450,000 international units/g.) is dissolved in 150 g. of the monoester of stearic acid and a polyethylene glycol having an average molecular weight of approximately 1000 which is at a temperature of 40 to 50° C. Distilled water is added, the pH of the solution adjusted to 7 with 0.1 N sodium hydroxide solution and then the solution diluted to a volume of 1 l. with distilled water and filtered through a Seitz filter. This vitamin A solution is a clear, sterile, pale yellow liquid of medium viscosity and is best suited for the parenteral administration of large doses of vitamin A.

Example 5

73.3 mg. of riboflavin, 0.1 g. of ethanolamine and 917 mg. of nicotinamide are dissolved in 15 ml. of distilled water by heating and the resulting clear solution diluted to 20 ml. with distilled water. The solution is cooled and 6 g. of ascorbic acid added with stirring. 292 mg. of thiamin chloride hydrochloride and 183.3 mg. of pyridoxin hydrochloride are added and the solution added to a solution of 20 g. of lactose in 75 ml. of water. This is Solution I.

Solution II is prepared by adding with stirring 0.096 ml. of irradiated ergosterol (1,000,000 international units/g.) to 10 g. of the monoester of stearic acid and a polyethylene glycol having an average molecular weight of approximately 900 which is just warm enough to remain in the liquid state.

Solution I is added to Solution II and thoroughly mixed to produce about 125 ml. of a clear, amber solution which is adjusted to pH 4.5 with alkali. This solution is palatable, not bitter to the taste, and is non-toxic and stable. The solution may be used for the administration of vitamins or it may be desiccated as follows to yield a vitamin powder.

The above solution (about 125 ml.) is frozen while being rotated in a 500 ml. bottle. The material is desiccated as given under Example 2 at about 100 microns of pressure for twenty-four hours to yield a dry yellow powder. This powder is completely and readily soluble in water, stable, non-bitter, and non-toxic. The various processes involved in the preparation of this powder do not impair the physiological activity of the active ingredients present in this product.

Example 6

73.3 mg. of riboflavin, 0.1 g. ethanolamine and 717 mg. of nicotinamide are dissolved in 15 ml. of distilled water by heating and the resulting clear solution diluted to 20 ml. with distilled water. After cooling, 6 g. of ascorbic acid, 292 mg. of thiamin chloride hydrochloride and 183.3 mg. of pyridoxin hydrochloride are added with stirring. The resulting solution is then added to a solution of 20 g. of lactose dissolved in 75 ml. of water. This is Solution I.

Solution II is prepared by dissolving 2.6 g. of vitamin A distillate (430,000 international units/g.) and 0.096 ml. of an alcoholic solution of irradiated ergosterol (1,000,000 international units/ml.) in 10 g. of the molten monoester of stearic acid and a polyethylene glycol, the glycol portion having an average molecular weight of approximately 900, which is at a temperature just above the melting point.

Solutions I and II are mixed and the pH adjusted to 4.5. This clear, amber solution is stable, non-toxic and is not bitter to the taste. It can be used for medicinal purposes as such or it may be converted to a powder by freezing and desiccating the frozen material without melting at 100 microns pressure for twenty-four hours. The resulting yellow powder is readily soluble in water, stable, non-toxic and is not bitter to the taste. This product is practically non-hygroscopic and may be dispensed as a powder, tablet or in any other convenient and suitable form.

Example 7

10 g. of a monoester of stearic acid and a polyethylene glycol, the glycol portion having an average molecular weight of approximately 900, is melted by warming and 1.94 g. of vitamin A distillate (416,000 international units/g.) and 0.081 g. of irradiated ergosterol (1,000,000 international units/g.) added thereto with stirring. An ascorbic acid, lactose and sodium hydroxide solution is prepared by adding 6 g. of ascorbic acid to a solution of 20 g. of lactose in 75 ml. of distilled water, after which 4 ml. of 5 N sodium hydroxide solution is added with stirring.

The two solutions are combined, well mixed, frozen and the water removed by desiccation under approximately 100 microns of pressure to yield a light colored powder. This powder is stable, readily soluble in water, non-hygroscopic and contains the vitamins A, D and C.

Example 8

2.6 g. of vitamin A distillate (430,000 international units/g.) and 0.081 g. of irradiated ergosterol (1,000,000 international units/g., in 5 ml. of alcohol) are dissolved with stirring in 15 g. of the melted monoester of palmitic acid and a straight chain polyethylene glycol having an average molecular weight of approximately 700. A solution of 3 g. of ascorbic acid in 100 ml. of distilled water containing 2 ml. of 5 N sodium hydroxide solution is added with stirring and the solution made up to a volume of 500 ml. with distilled water. The final solution of vitamins A and D is water clear and stable and is especially valuable where it is desired to administer these vitamins without at the same time administering an oily vehicle.

Example 9

15 g. of the monoester of palmitic acid and a straight chain polyethylene glycol, the glycol having an average molecular weight of approximately 1400, is warmed carefully until completely melted and then 2.6 g. of vitamin A distillate (430,000 international units/g.) and 0.081 g. of irradiated ergosterol (1,000,000 international units/g., in 5 ml. of alcohol) are added with stirring. After the vitamins have dissolved, a solution of 3 g. of ascorbic acid in 100 ml. of distilled water containing 2 ml. of 5 N sodium hydroxide solution is added with stirring and the solution made up to a volume of 500 ml. with distilled water.

Example 10

3 g. of ascorbic acid is added with stirring to a solution of 0.03 g. of riboflavin in 300 ml. of water and the resulting solution neutralized by the addition of 2 ml. of 5 N sodium hydroxide solution. 0.5 g. of thiamin chloride hydrochloride is added with stirring, the solution added to a solution of vitamin A distillate and diluted to 500 ml. with distilled water. The final pH of the solution is adjusted to 4.5.

The above mentioned solution of vitamin A distillate is prepared by melting 15 g. of the mono-ester of arachidic acid and a straight chain polyethylene glycol, the glycol portion of said ester having an average molecular weight of approximately 800, and then adding thereto with stirring 3.5 g. of vitamin A distillate (450,000 international units/g.).

Example 11

30 g. of vitamin A distillate (450,000 international units/g.) is dissolved in 125 g. of the melted mono-ester of margaric acid and a straight chain polyethylene glycol of average molecular weight about 1200. 5 mg. of synthetic racemic α-tocopherol acetate is added with stirring, the solution diluted to 1 l. with distilled water, and the pH of the solution adjusted to 7. The clear aqueous solution is stable and exerts both vitamin A and vitamin E effects when administered to man or animals.

Example 12

5 g. of vitamin A distillate (430,000 international units/g.), 0.081 g. of irradiated ergosterol (1,000,000 international units/g., used as a 1–5 alcohol solution) and 0.2 g. of the sodium salt of the diphosphoric acid ester of 2-methyl-1,4 naphthohydroquinone are dissolved in 25 g. of the mono-ester of oleic acid and a straight chain polyethylene glycol of average molecular weight about 1250 at a temperature of 40–45° C. The resulting solution is diluted to 300 ml. with distilled water and the pH of the solution adjusted to 6.5. The finished vitamin solution is water clear and stable and is especially valuable for administration of vitamins A, D and K without at the same time administering an oily vehicle.

Example 13

3 g. of vitamin A distillate (400,000 international units/g.) is dissolved in 25 g. of the mono-ester of linoleic acid and a straight chain polyethylene glycol, said glycol having an average molecular weight of approximately 1100, which is at a temperature of 40–45° C. The solution is diluted to 200 ml. with distilled water and the pH of the solution adjusted if necessary to 7 by the addition of alkali.

I prefer to prepare my solid vitamin preparations by first freezing the new aqueous vitamin solutions and then subliming the ice so produced under greatly reduced pressures. I have found that when carrying out the dehydration process in this manner it is advantageous to raise the temperature slightly at the end of the sublimation to remove the last traces of moisture from the solid product. However, it should be obvious to those skilled in the art that I may carry out this dehydration process by removing the water from my new aqueous vitamin solutions with or without previous freezing at temperatures below that which causes destruction of vitamin activity and under reduced pressures other than the preferred pressures which I have indicated in the foregoing examples.

What I claim is:

1. A vitamin preparation comprising an oil containing a vitamin A alcohol ester of a straight chain higher aliphatic carboxylic acid, and a solubilizing mono-ester of a straight chain aliphatic carboxylic acid containing 16 to 21 carbon atoms inclusive and a straight chain polyethylene glycol having an average molecular weight between 700 and 1500, said mono-ester dissolving the oil containing the vitamin A alcohol ester, and said vitamin preparation being soluble in water to form a clear stable aqueous solution.

2. A vitamin preparation comprising an oil containing a vitamin A alcohol ester of a straight chain higher aliphatic carboxylic acid, and a solubilizing mono-ester of stearic acid and a straight chain polyethylene glycol having an average molecular weight of 1000, said mono-ester dissolving the oil containing the vitamin A alcohol ester, and said vitamin preparation being soluble in water to form a clear stable aqueous solution.

3. A stable aqueous solution comprising water, an oil containing a vitamin A alcohol ester of a straight chain higher aliphatic carboxylic acid, and a solubilizing mono-ester of a straight chain aliphatic carboxylic acid containing 16 to 21 carbon atoms inclusive and a straight chain polyethylene glycol having an average molecular weight between 700 and 1500.

4. A stable aqueous solution comprising water, a high vacuum vitamin A ester distillate of an oil containing vitamin A esters, and a solubilizing mono-ester of a straight chain aliphatic carboxylic acid containing 16 to 21 carbon atoms inclusive and a straight chain polyethylene glycol having an average molecular weight between 700 and 1500.

5. A stable aqueous solution comprising water, a high vacuum vitamin A ester distillate of an unsaponified fish liver oil containing vitamin A esters, and a solubilizing mono-ester of stearic acid and a straight chain polyethylene glycol having an average molecular weight of about 1000.

ALBERT L. RAWLINS.

REFERENCES CITED

The following references are of record in the file of this patent:

UNITED STATES PATENTS

| Number | Name | Date |
| --- | --- | --- |
| 1,970,578 | Schoeller et al. | Aug. 21, 1934 |
| 2,167,144 | Barton et al. | July 25, 1939 |
| 2,311,554 | Lipsius | Feb. 16, 1943 |
| 2,407,624 | Bird et al. | Sept. 17, 1946 |
| 2,417,299 | Freedman et al. | Mar. 11, 1947 |